United States Patent
Kadesh

(12) 
(10) Patent No.: US 6,641,289 B1
(45) Date of Patent: Nov. 4, 2003

(54) CENTERING LIGHT FOR MOTOR VEHICLES

(76) Inventor: Stanley D. Kadesh, P.O. Box 65300, Port Ludlow, WA (US) 98365

( * ) Notice: Subject to any disclaimer, the term of this patent is extended or adjusted under 35 U.S.C. 154(b) by 0 days.

(21) Appl. No.: 09/624,264

(22) Filed: Jul. 24, 2000

(51) Int. Cl.[7] .................................................. F21L 7/00
(52) U.S. Cl. ..................................................... 362/487
(58) Field of Search ................................ 362/496, 489, 362/540, 532, 523, 486, 295, 183, 487, 285, 430, 418; 340/438, 901, 903, 905; 248/122.1, 124.7, 125.8, 157

(56) References Cited

U.S. PATENT DOCUMENTS

| | | | | |
|---|---|---|---|---|
| 2,584,777 A | * | 2/1952 | Adolfson | 362/496 |
| 4,428,033 A | * | 1/1984 | McBride | 362/183 |
| 4,947,291 A | * | 8/1990 | McDermottq | 362/19 |
| 5,564,816 A | * | 10/1996 | Arcadia et al. | 362/183 |

* cited by examiner

Primary Examiner—Sandra O'Shea
Assistant Examiner—Anabel Ton

(57) ABSTRACT

A small structure to be mounted on the dashboard of a motor vehicle to the left of the driver, or to the right of the driver in a right hand drive vehicle, comprised of two pieces of metal, or other rigid material, with a light emitting source on the top whose intensity can be adjusted. The screw connecting the two pieces of metal, or other rigid material, can be loosened to heighten or lower the section upon which the light emitting source is positioned. The screw connecting the structure to the dashboard can be loosened to allow pivotal positioning of the structure on a horizontal plane. When the structure is properly adjusted the driver can look across the light emitting source and when said light emitting source is aligned with the center line of the roadway, the left lane line of the lane of travel, or the right lane line in a right band drive vehicle, the vehicle will be centered in the lane of travel.

2 Claims, 2 Drawing Sheets

CENTERING LIGHT FOR MOTOR VEHICLES

CROSS-REFERENCE TO RELATED APPLICATIONS

Not applicable.

BACKGROUND—FIELD OF INVENTION

This invention relates to a light source within the drivers line of vision when lined up with the center line of the roadway, verifies that the vehicle is centered in the roadway.

BACKGROUND—DESCRIPTION OF PRIOR ART

When operating a wide motor vehicle on the road it is necessary to keep the vehicle in the center of the road. This is especially necessary when crossing narrow bridges or traveling on narrow roads. At night it is very difficult to ascertain the distance between the vehicle and the right side of the road.

An inexperienced driver, especially at night, becomes very ill at ease by not knowing where the vehicle is in relationship to the road, and can easily cause property damage and/or bodily injury by accidentally crossing the centerline of the roadway.

Inventors have created several types of light sources to be in the field of view of the operator of a motor vehicle. U.S. Pat. No. 4,642,737 to Meyers, Jr. (1987) discloses a light conveying conduit placed in the field of view of the operator of a motor vehicle with the other end attached to a suction cup to be placed on the headlight of a motor vehicle to ascertain if the headlight is lit.

This invention could not be used for the purpose of the subject invention because the positioning over the headlight would not align the vehicle in the roadway when lined up with the centerline of the road. In addition, if the headlight were not lit, no alignment would be possible at night.

In addition, the suction cup could lose it's suction when affected by rain, wind or change in temperature, and fall off of the vehicle. U.S. Pat. No. 4,811,171 to Viola (1989) discloses a lighting system consisting of a housing containing a light source and at least one transparent light-transmitting plastic rod disposed at one end and several light-transmitting plastic rods to provide lighting at one or more positions of the trailer.

The purpose of this invention is to illuminate the cradle portion of a trailer designed for supporting a boat. This invention has an entirely different application than the subject invention, and being at the rear of the motor vehicle, could not be used for the centering of the motor vehicle on the roadway.

SUMMARY

In accordance with the present invention a light source supported on a metal or plastic base which can be attached to the dashboard of a motor vehicle, or elsewhere on the vehicle, and which adjusts to raise or lower the light source so that it is in the field of view of the operator of a motor vehicle. Said light source can be attached to a rheostat to increase or decrease the intensity of said light source.

Objects and Advantages

Several objects and advantages of the present invention are:

(a) To provide a guide which can be used at night as well as in the daytime to maintain the vehicle in the center of the lane of travel.

(b) to provide a guide which can be adjusted by raising or lowering the shaft to better align the light source between the drivers line of sight and the center or left line of the lane of travel.

(c) to provide a guide which can easily be adjusted horizontally to line up with the left line of the lane of travel to keep the vehicle in the center of said lane of travel.

Further objects and advantages are to provide a guide which can be used easily and conveniently to center a vehicle in the lane of travel, which is simple to use and inexpensive to manufacture. Still further objects and advantages will become apparent from a consideration of the ensuing description and drawings.

DRAWING FIGURES

Reference Numerals in Drawings

10 faceplate
14 support plate
18 screw
22 light emitting source
26 electrical wires
30 hole for wire
12 longitudinal through-hole
16 threaded support plate hole
20 hole
24 rheostat
28 battery

DESCRIPTION

Figure 1:
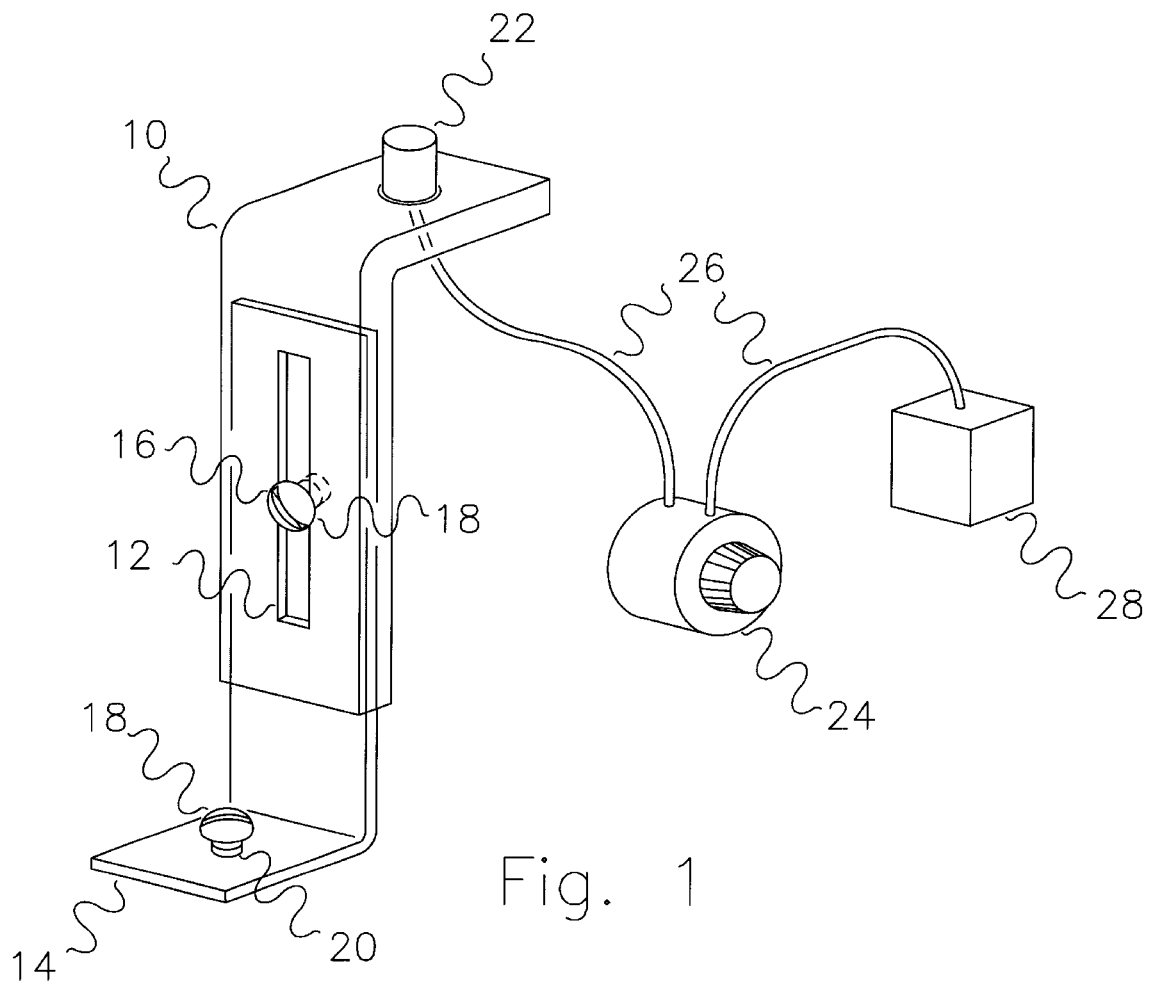
FIG. 1 shows an Isometric View

FIG. 1—Preferred Embodiment

A preferred embodiment of the centering light of the present invention is illustrated in FIG. 1. The centering light has a thin face plate 10 of rigid material, the upper portion of which can be bent at a 90 degree angle, wherein the light emitting source 22 is mounted. The thin support plate 14 is of a rigid material, the lower portion being bent at a 90 degree angle, or a second section attached at a 90 degree angle. Said bent or attached section containing a hole 20 by which it can be secured in an upright position by a screw 18. The support plate 14 fits inside the face plate 10 and is attached by a screw 18 which passes through the longitudinal through-hole 12 and screws into the threaded support plate hole 16. The light emitting source 22 is connected to the rheostat 24 by two electrical wires 26 and the rheostat 24 is connected to the battery 28 by means of two electrical wires 26. In order to raise or lower the light emitting source a screw 18 which passes through the longitudinal through-hole 12 can be loosened, the height adjusted, and screw 18 re-tightened. In order to adjust the light emitting source 22 on a horizontal plane, screw 18 which passes through hole 20 can be loosened, and the support plate will swivel on the axis of the screw, thereby moving the light emitting source 22 horizontally.

Figure 2:
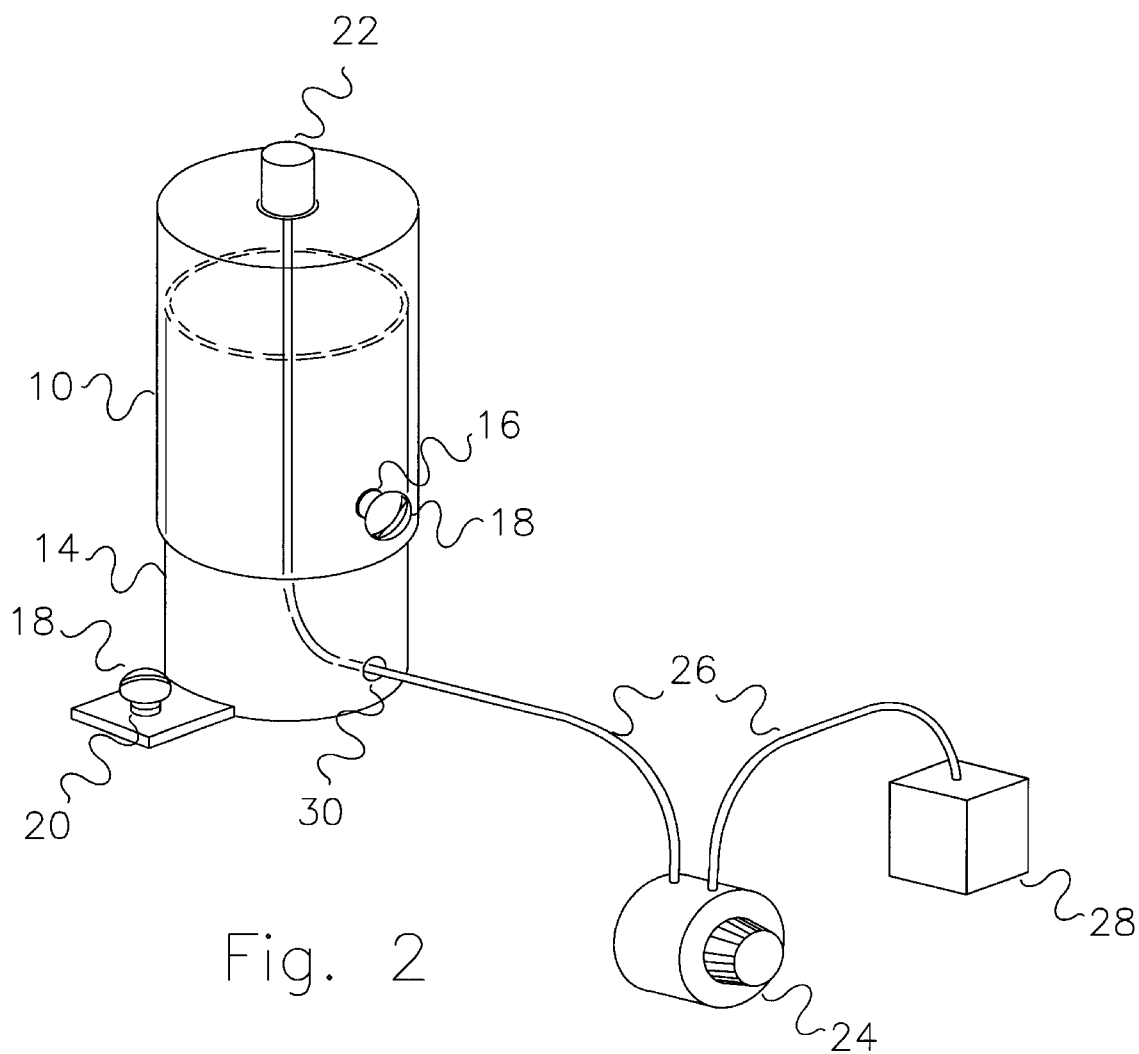
FIG. 2 shows a Frontal View

FIG. 2—Alternative Embodiment

Additional embodiment is shown in FIG. 2 wherein the stand for the centering light is made out of a cylindrical material. An inside cylinder 14 and an outside cylinder 10 is used. The outside cylinder 10 is supported by the inside cylinder 14 allowing the outside cylinder 10 to slide up and down so it can be adjusted vertically by loosening a screw 18 which goes through hole 16 and tightens against the outer wall of cylinder 14. The inside cylinder 14 is attached to a base 13 which is secured to the vehicle by screw 18 which goes through hole 20.

By loosening screw 18 which goes through hole 20, the centering light stand can be rotated on the axis of the screw 18, thereby adjusting the light emitting source on a horizontal plane.

Advantages

From the description above, a number of advantages of my centering light become evident:

(a) By being able to adjust the centering light stand vertically it can be raised or lowered to the drivers line of sight regardless of the drivers height or the contour of that portion of the vehicle where it is attached.

(b) by being able to adjust the centering light stand horizontally it can be moved on a horizontal plane so the light emitting source can be in the drivers line of sight.

(c) By having the light emitting source wired to a rheostat the driver can adjust the brightness of the light emitting source for daytime or nighttime driving conditions.

Conclusions, Ramifications, and Scope

Accordingly the reader will see that the centering light of this invention can be used to assist the driver of a motor vehicle to keep the vehicle centered in the lane of travel.

It permits the driver to adjust the emitting light vertically to be in the line of vision from the driver to the center line of the roadway or the left lane line of the lane of travel.

It permits the driver to adjust the emitting light horizontally to be in the line of vision from the driver to the center line of the roadway or the left lane line of the lane of travel.

It permits the driver to increase or decrease the illumination being emitted from the light source, to satisfy either daylight or night time driving conditions.

Although the description above contains many specificities, these should not be construed as limiting the scope of the invention but as merely providing illustrations of some of the presently preferred embodiments of this invention. For example, the stand for the centering light can have other shapes, such as oval, trapezoidal, triangular, etc. The location of the centering light can be on the dashboard, on the front fenders, or elsewhere where it can be seen by the driver of the vehicle.

Thus the scope of the invention should be determined by the appended claims and their legal equivalents, rather than by the examples given.

I claim:

1. A centering light for motor vehicles, comprising:

an illuminated device which when centered between a vehicle drivers line of sight and the left line of the lane of travel assures that the vehicle is centered in the lane of travel, wherein the improvement comprises:

(a) a structure which is height adjustable having a first end and a second end;

(b) a mounting means disposed proximate said second end of said adjustable structure for mounting said structure to a vehicle dashboard and rotatable on its horizontal axis;

(c) an illuminating source attached to the first end of said adjustable structure.

2. The centering light according to claim 1, wherein the shaft is flat in shape.

* * * * *